(12) United States Patent
Fusco et al.

(10) Patent No.: US 9,138,104 B2
(45) Date of Patent: Sep. 22, 2015

(54) EGG YOLK SEPARATION APPARATUS AND METHODS

(71) Applicant: Quirky, Inc., New York, NY (US)

(72) Inventors: Mark Fusco, Sugar Land, TX (US);
Aaron Saxton, New York, NY (US);
Nicholas Oxley, Brooklyn, NY (US)

(73) Assignee: QUIRKY, INC., New York, NY (US)

( * ) Notice: Subject to any disclaimer, the term of this patent is extended or adjusted under 35 U.S.C. 154(b) by 0 days.

(21) Appl. No.: 14/162,137

(22) Filed: Jan. 23, 2014

(65) Prior Publication Data

US 2014/0144336 A1     May 29, 2014

Related U.S. Application Data

(62) Division of application No. 13/737,740, filed on Jan. 9, 2013.

(60) Provisional application No. 61/730,605, filed on Nov. 28, 2012.

(51) Int. Cl.
*A47J 43/14* (2006.01)

(52) U.S. Cl.
CPC ...................................... *A47J 43/14* (2013.01)

(58) Field of Classification Search
USPC ........ 426/298, 490, 478, 614; 99/345; 141/26
See application file for complete search history.

(56) References Cited

FOREIGN PATENT DOCUMENTS

| CN | 201977623 | 9/2011 |
|---|---|---|
| DE | 202005016492 | 2/2006 |
| WO | WO 03/000230 | 1/2003 |

OTHER PUBLICATIONS

English Translation CN 201977623 U.*
The International Search Report of PCT/US2013/072179, Nov. 27, 2013, which is enclosed.

* cited by examiner

*Primary Examiner* — D. Lawrence Tarazano
*Assistant Examiner* — Stephanie Cox
(74) *Attorney, Agent, or Firm* — Cowan, Liebowitz & Latman, P.C.; Steven D. Underwood (57) ABSTRACT

An exemplary aspect comprises a device for separating an egg yolk from an egg white, comprising: (a) a yolk chamber component comprising a first opening and a second opening; and (b) a vacuum chamber component comprising an opening, wherein the second opening of the yolk chamber component is detachably connected to the opening of the vacuum chamber component. Another exemplary aspect comprises a method of separating an egg yolk from an egg white, comprising: (a) compressing a vacuum chamber component, wherein the vacuum chamber component is detachably connected to a yolk chamber component, and wherein the yolk chamber component is empty; (b) placing the first opening of the yolk chamber component against an egg yolk; and (c) releasing pressure on the vacuum chamber component until the egg yolk is drawn into the yolk chamber component.

26 Claims, 13 Drawing Sheets

EGG YOLK SEPARATION APPARATUS AND METHODS

CROSS-REFERENCE TO RELATED APPLICATIONS

This application is a divisional of U.S. application Ser. No. 13/737,740, filed Jan. 9, 2013, which claims priority to U.S. Provisional Patent Application No. 61/730,605, filed Nov. 28, 2012, entitled "Egg Yolk Separation Apparatus and Methods." The entire contents of the above-referenced applications are incorporated herein by reference.

INTRODUCTION

While it is known that an egg yolk may be separated from its egg white using a plastic water bottle having suitable dimensions (see, for example, http://kitchenista-welcometomykitchen.blogspot.com/2012/10/how-to-separate-eggs-separate-eggs-with.html and http://www.youtube.com/watch?v=Uz2Vnp5ZW4c), plastic bottles have several disadvantages, including: (a) imperfect separation of the egg yolk from the egg white in inclusion of some egg white with the separated egg yolk; (b) rupturing of the egg yolk during separation from the egg white; (c) difficulty separating more than one egg without first emptying each egg yolk from the bottle before separating another egg; and (d) difficulty removing and replacing an egg yolk from/in an egg white without rupturing the egg yolk and/or losing some of the egg in the bottle.

Moreover, plastic bottles are difficult to clean, resulting in a likelihood of bacterial contamination upon repeated use.

Also, plastic bottles may be difficult to squeeze, and often are noisy when squeezed.

Finally, an empty plastic bottle is not an aesthetically pleasing item to keep in one's kitchen.

Thus, what is needed is an apparatus for separating an egg yolk from its egg white, that is reusable, easily cleaned, and aesthetically pleasing both visually and audibly (i.e., doesn't make the unpleasant cracking sound made by a plastic water bottle when squeezed).

An exemplary aspect comprises a device for separating an egg yolk from an egg white, comprising: (a) a yolk chamber component comprising a first opening and a second opening; and (b) a vacuum chamber component comprising an opening, wherein the second opening of the yolk chamber component is detachably connected to the opening of the vacuum chamber component.

In various exemplary embodiments: (1) the vacuum chamber component creates a vacuum, when compressed and released by a user, sufficient to draw an egg yolk into the yolk chamber component; (2) the yolk chamber component consists primarily of one or more of polycarbonate, PP, SAN, and Tritan; (3) the yolk chamber component consists primarily of a rigid, food-safe material; (4) the vacuum chamber component consists primarily of a flexible, food-safe material; (5) the yolk chamber component is transparent; (6) the vacuum chamber component consists primarily of at least one of TPE and silicone; (7) the vacuum chamber component is detachably connected to the yolk chamber component via a press fitting; (8) the press fitting is a ribbed press fitting; and (9) the vacuum chamber component is detachably connected to the yolk chamber component via a threaded fitting.

Another exemplary aspect comprises a method of separating an egg yolk from an egg white, comprising: (a) compressing a vacuum chamber component, wherein the vacuum chamber component is detachably connected to a yolk chamber component, and wherein the yolk chamber component is empty; (b) placing the first opening of the yolk chamber component against an egg yolk; and (c) releasing pressure on the vacuum chamber component until the egg yolk is drawn into the yolk chamber component.

In various exemplary embodiments, the method further comprises: (1) compressing the vacuum chamber component until the egg yolk emerges from the egg yolk chamber component; (2) disconnecting the yolk chamber component from the vacuum chamber component, and separately cleaning the yolk chamber component and the vacuum chamber component; and (3) connecting the yolk chamber component to the vacuum chamber component.

Another exemplary aspect comprises a device for separating an egg yolk from an egg white, comprising a vacuum chamber component comprised of a flexible, food-safe material and an opening, wherein the vacuum chamber component is operable to be connected to a yolk chamber component comprised of a rigid, food-safe material and a first opening and a second opening.

In various exemplary embodiments: (1) the vacuum chamber component consists primarily of at least one of TPE and silicone; and (2) the vacuum chamber component creates a vacuum, when compressed and released by a user, sufficient to draw an egg yolk into the yolk chamber component.

Another exemplary aspect comprises a device for separating an egg yolk from an egg white, comprising a yolk chamber component comprised of a rigid, food-safe material and a first opening and a second opening, wherein the yolk chamber component is operable to be connected to a vacuum chamber component comprised of a flexible, food-safe material and an opening.

In various exemplary embodiments: (1) the vacuum chamber component creates a vacuum, when compressed and released by a user, sufficient to draw an egg yolk into the yolk chamber component; and (2) the yolk chamber component consists primarily of one or more of polycarbonate, PP, SAN, and Tritan.

Other exemplary aspects and embodiments, and their advantages, will be apparent from the drawings and description below.

DETAILED DESCRIPTION OF CERTAIN EXEMPLARY EMBODIMENTS

Figure 1:
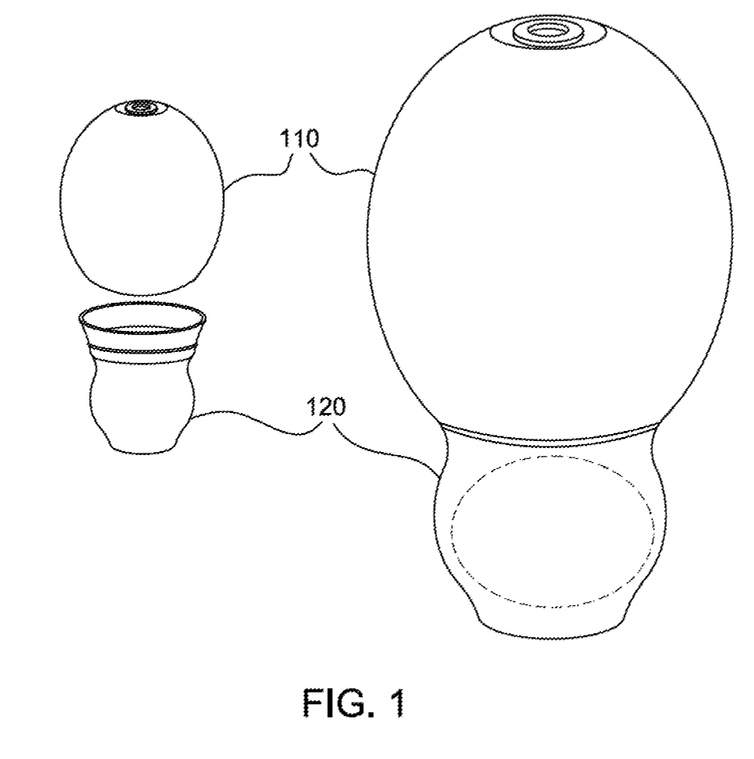
FIG. 1 depicts an exemplary embodiment, assembled and disassembled.

An exemplary apparatus embodiment allows a user to easily separate an egg yolk from an egg white. An exemplary apparatus embodiment is depicted in FIG. 1. In this exemplary embodiment, the apparatus comprises two components: a vacuum chamber component 110, and a yolk chamber component 120. Those skilled in the art will understand that other embodiments may comprise a single component, or more than two components.

In an exemplary embodiment, a vacuum chamber component 110 may be comprised of TPE, silicone, or a similar flexible, durable material.

In an exemplary embodiment, a yolk chamber component 120 may be comprised of polycarbonate, acrylic, polypropylene (PP), SAN, Tritan co-polyester, bioplastic, glass, and/or similar material suitable for use with food products, with colors such as egg shell white, Pantone Q716-2-1, Pantone Q716-3-1, and Pantone Q758-1-2. Although it is preferred that yolk chamber 120 be of a clear material, non-clear materials such as rigid melamine, rubbery polypropylene, and the like also may be used. Exemplary dimensions are: height 100 mm, width 54 mm, but of course other dimensions may be used in other embodiments.

Figure 2:
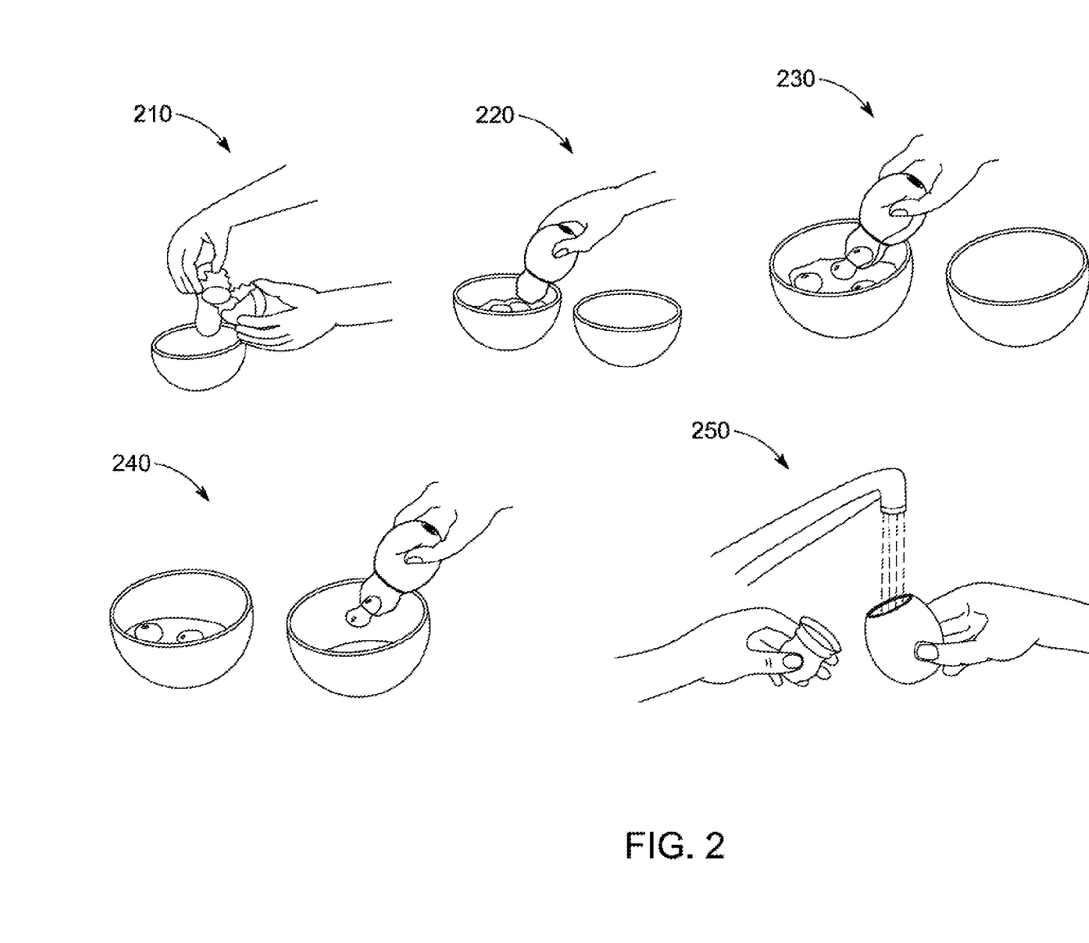
FIG. 2 depicts exemplary usage.
Figure 3:
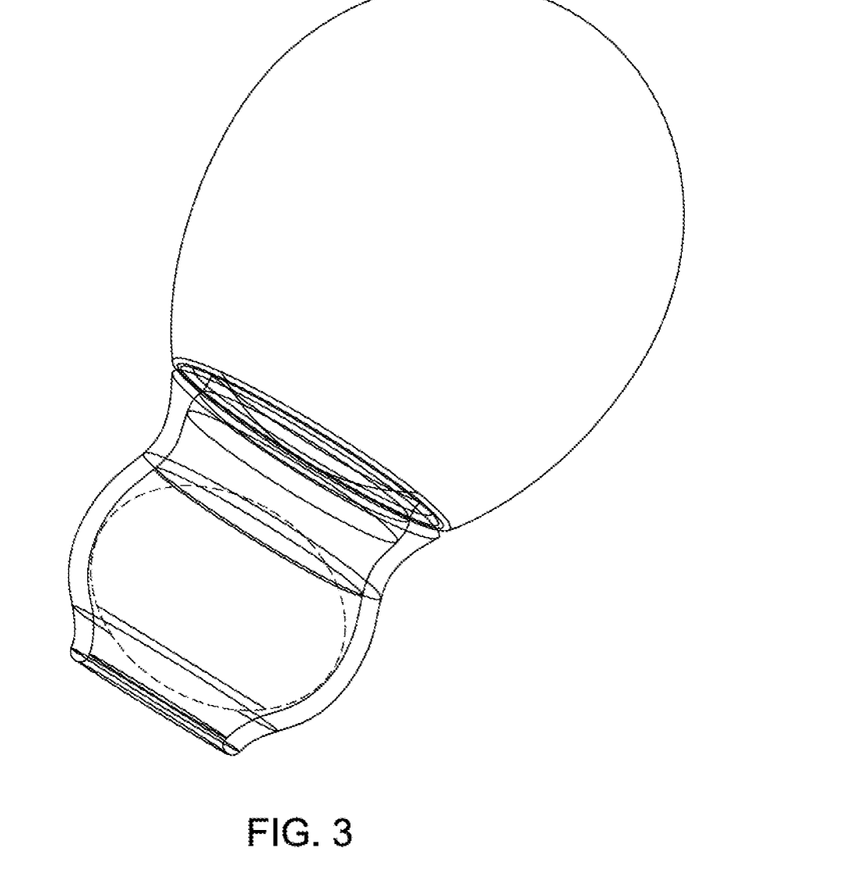
FIG. 3 depicts an exemplary embodiment.
Figure 4:
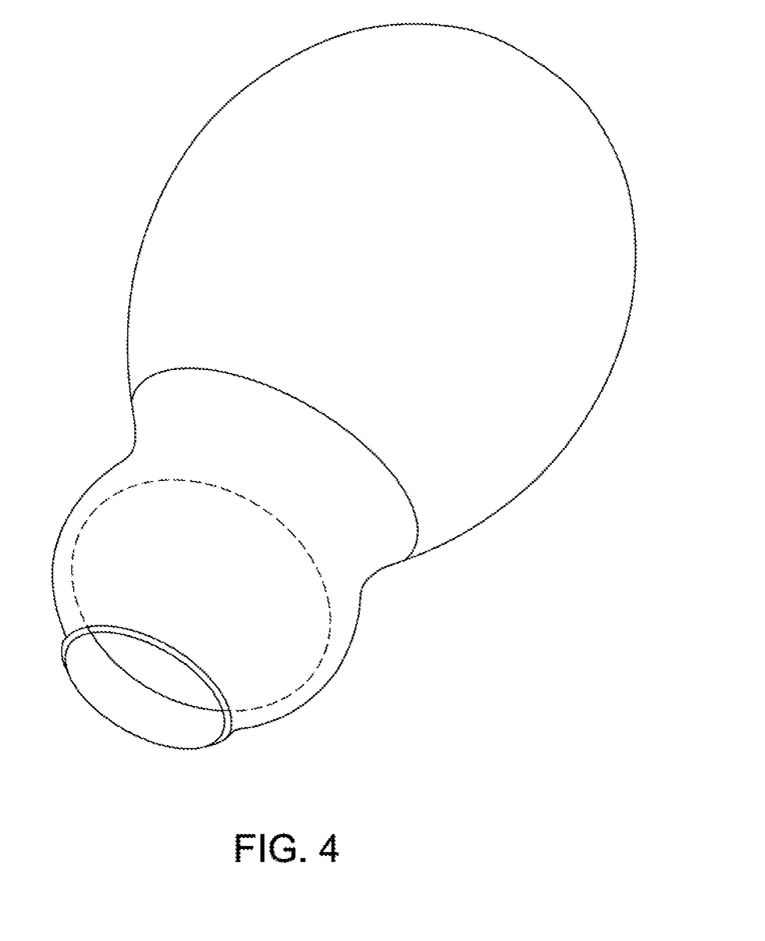
FIG. 4 depicts an exemplary embodiment.
Figure 5:
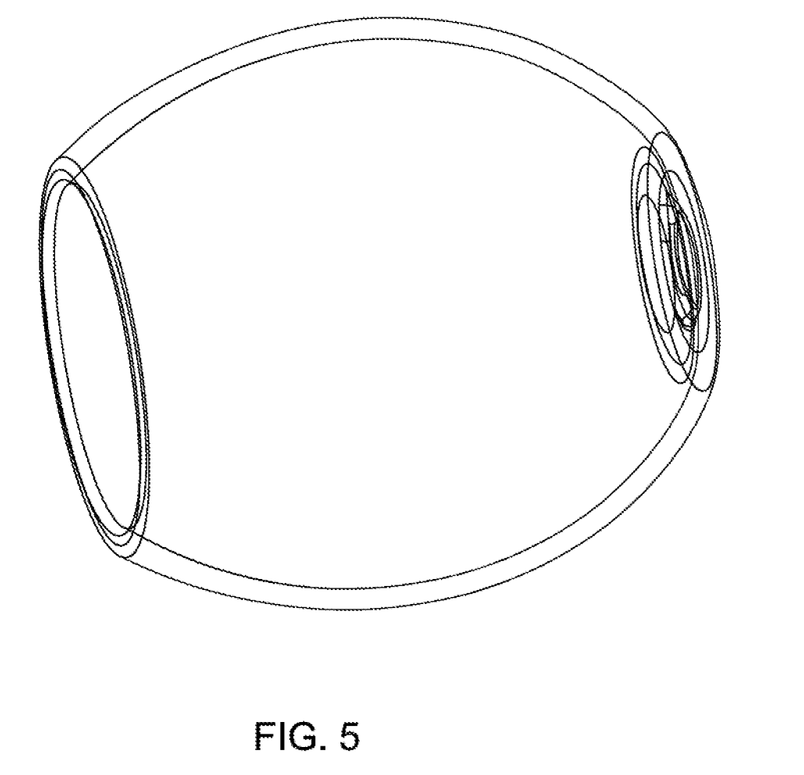
FIG. 5 depicts an exemplary vacuum chamber component.
Figure 6:
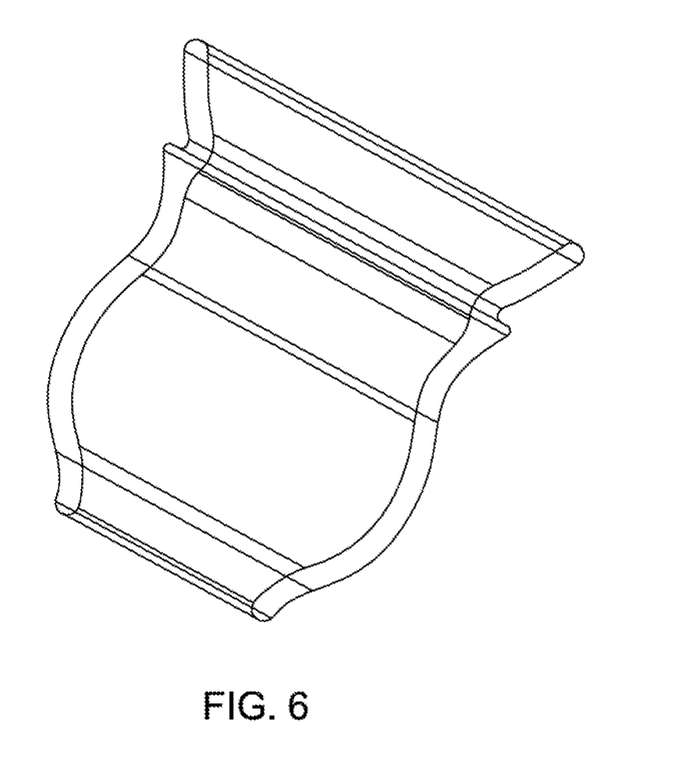
FIG. 6 depicts an exemplary yolk chamber component.
Figure 7:
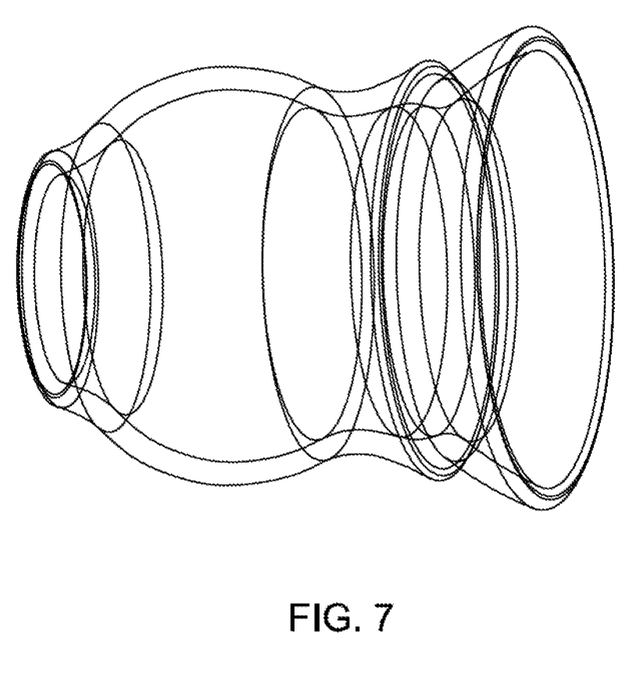
FIG. 7 depicts an exemplary yolk chamber component.
Figure 8:
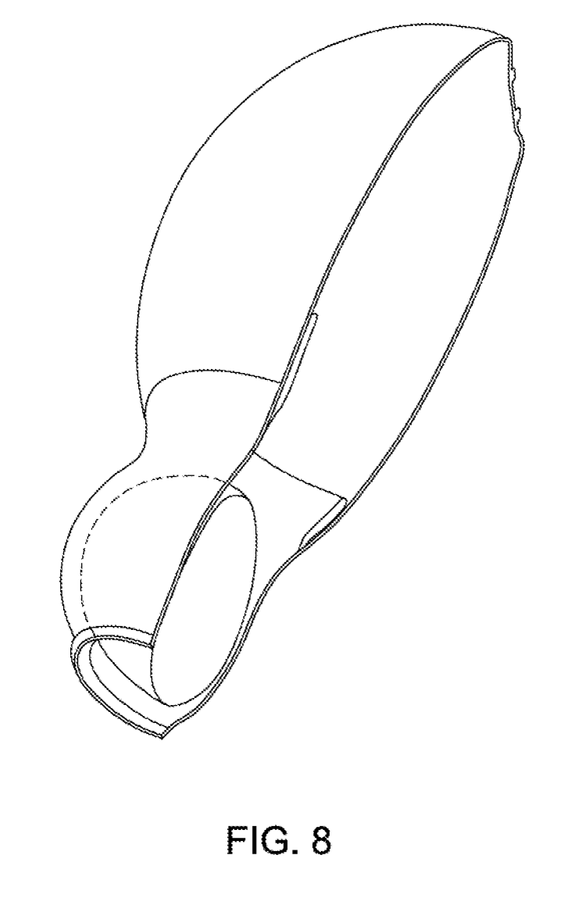
FIG. 8 depicts an exemplary embodiment, in a cutaway drawing.

An exemplary apparatus embodiment allows a user to easily separate egg yolks from egg whites. In an exemplary first step (see step 210 in FIG. 2), the user cracks an egg and disgorges the contents into a bowl. Then (at step 220) the user compresses vacuum chamber component 110 and places yolk chamber component 120 onto the egg yolk. The user then releases pressure (see step 230) on vacuum chamber component 110 to vacuum up the egg yolk. The yolk sits in yolk chamber component 120 until it is squeezed out, for example, into a separate bowl (see step 240).

The apparatus may be easily cleaned by separating vacuum chamber component 110 from yolk chamber component 120. See step 250 in FIG. 2. The two components may be then, for example, be hand washed or placed in a dishwasher.

Figure 9:
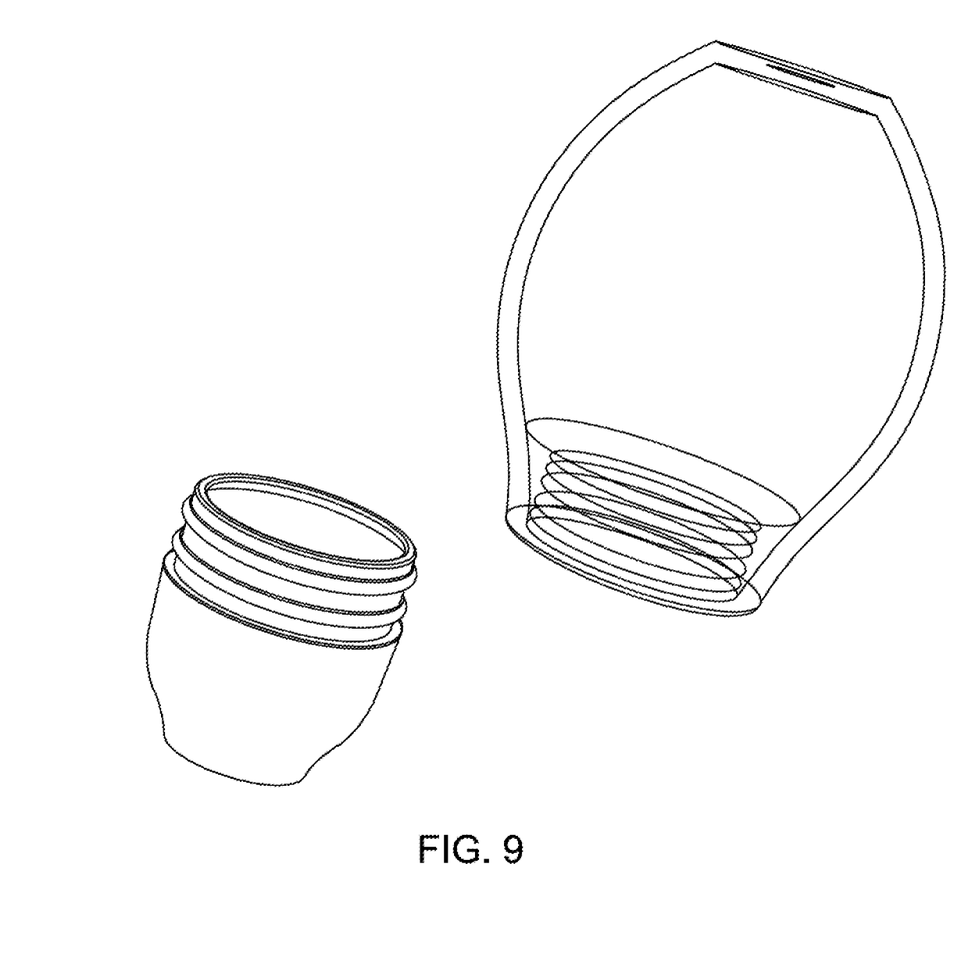
FIG. 9 depicts an exemplary embodiment, showing a press fit seal.
Figure 10:
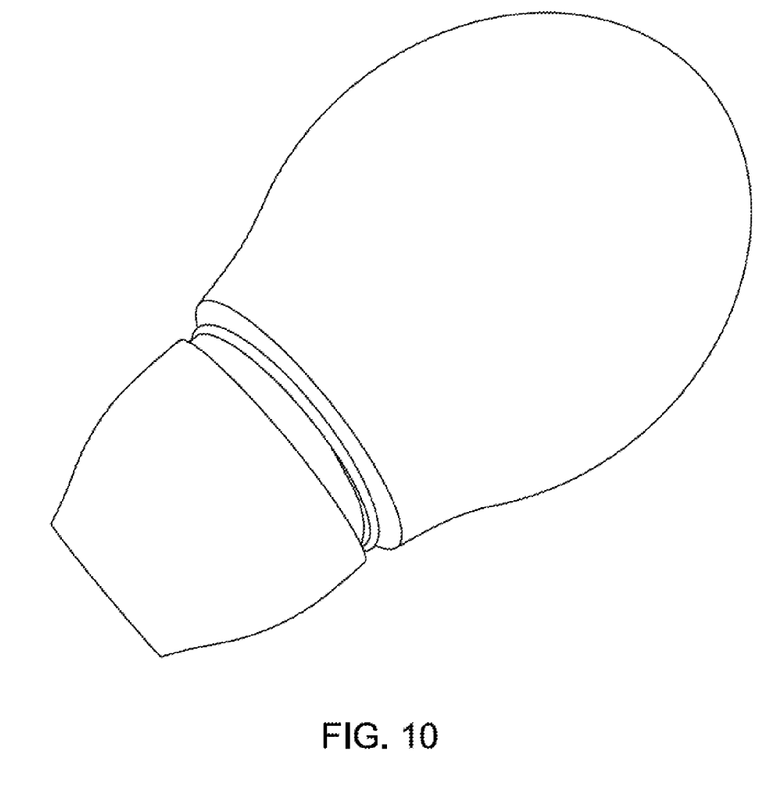
FIGS. 10 and 11 depict additional views of exemplary embodiments, in assembled configurations.
Figure 11:
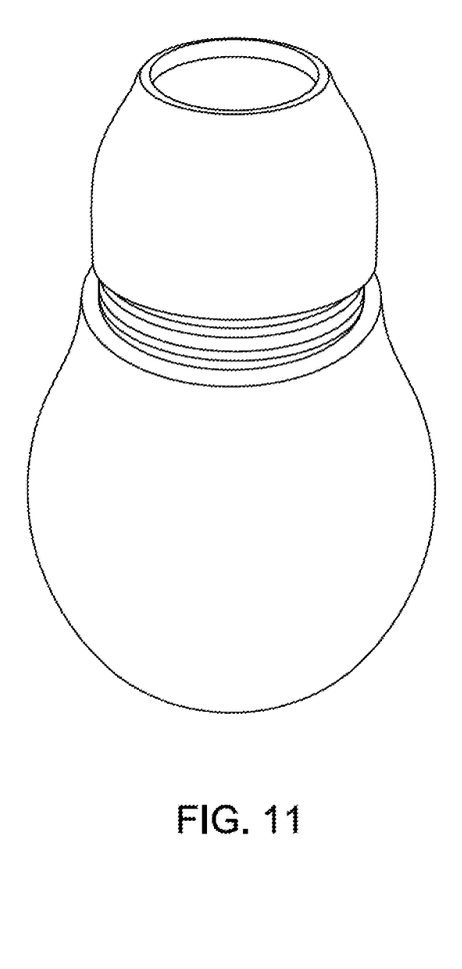
Figure 12:
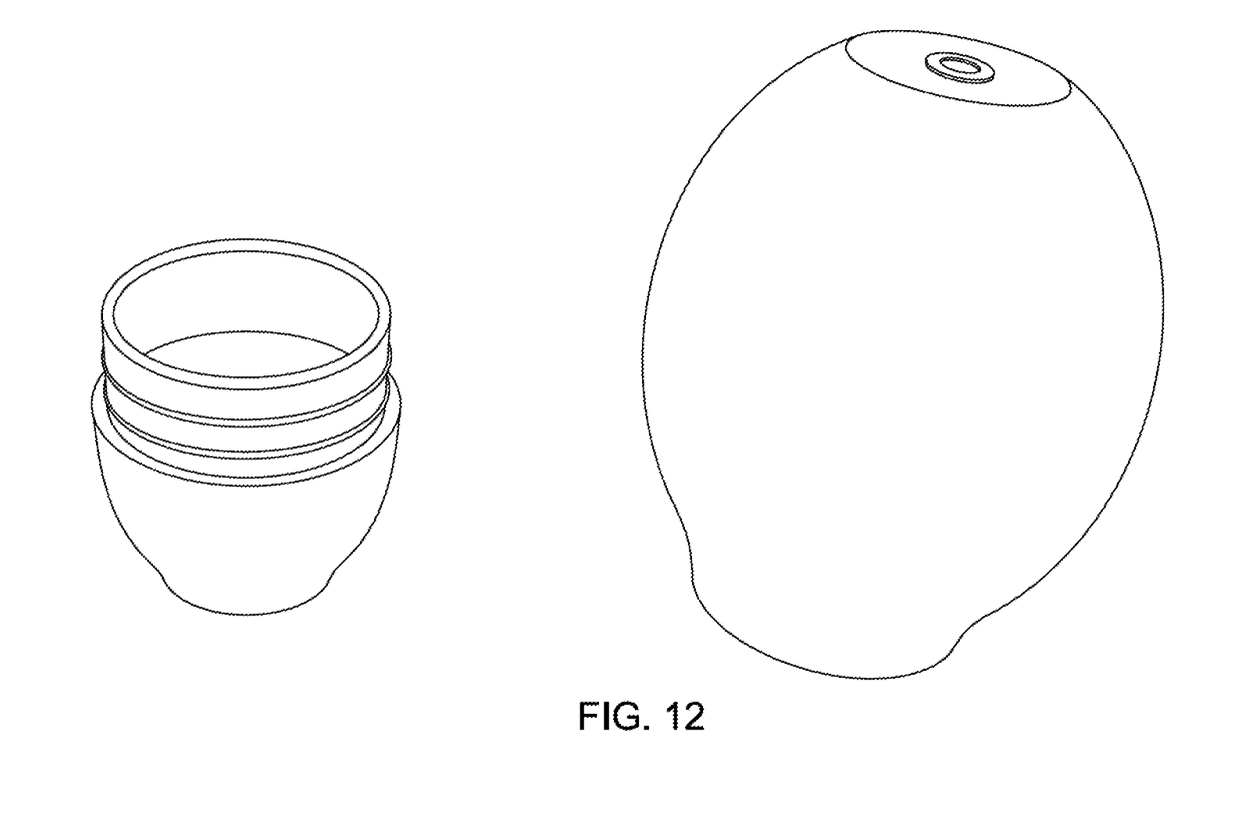
FIGS. 12 and 13 depict additional views of exemplary embodiments, in disassembled configurations.
Figure 13:
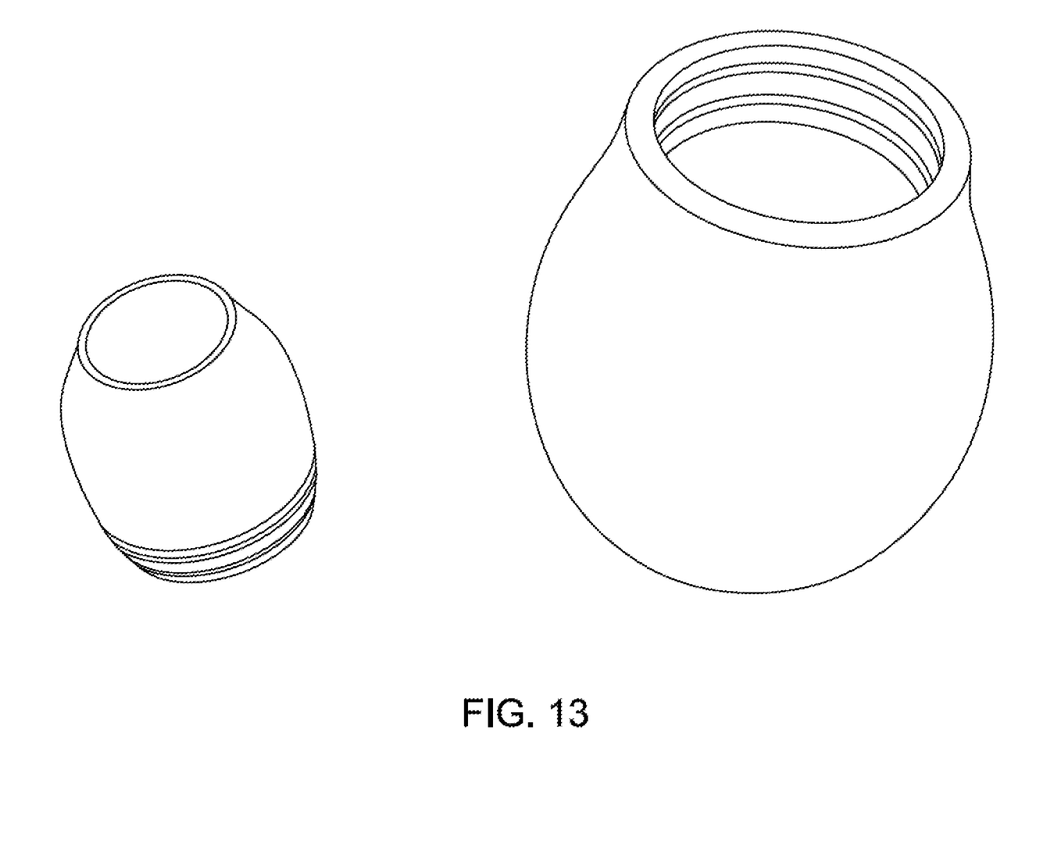

In an exemplary embodiment, vacuum chamber component 110 attaches to yolk chamber component 120 via a pressure fitting. One example using a press fit double ribbed seal is depicted in FIG. 9. In other embodiments, a threaded fitting may be used. Those skilled in the art will understand that other embodiments may use other types of connections between vacuum chamber component 110 and yolk chamber component 120.

While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

We claim:

1. A device comprising:
    a vacuum chamber comprising an opening; and
    a yolk chamber component comprising a first opening and a second opening, such that said second opening of said yolk chamber component is operable to be detachably connected to said opening of said vacuum chamber component;
    wherein a volume of said vacuum chamber component exceeds a volume of said yolk chamber component,
    wherein said yolk chamber component is internally cylindrical between an intermediate point of said yolk chamber component and said second opening of said yolk chamber component, and tapers linearly from said intermediate point to said first opening of said yolk chamber component,
    wherein said intermediate point is located between said first opening and said second opening,
    wherein said first opening has a first diameter and said second opening has a second diameter, and
    wherein said first diameter is less than said second diameter.

2. A device as in claim 1, wherein said yolk chamber component consists primarily of one or more of polycarbonate, polypropylene, styrene acrylonitrile, and copolyester.

3. A device as in claim 1, wherein:
    said yolk chamber component is symmetric about a first axis, and said vacuum chamber component is symmetric about a second axis, and
    when said yolk chamber component is connected to said vacuum chamber component, said first and second axes are aligned.

4. A device as in claim 3, wherein said yolk chamber component comprises varying radii about said first axis.

5. A device as in claim 4, wherein said vacuum chamber component comprises varying radii about said second axis.

6. A device as in claim 1, wherein said yolk chamber component is transparent.

7. A device as in claim 1, wherein said vacuum chamber component consists primarily of at least one of thermoplastic elastomer and silicone.

8. A device as in claim 1, wherein said vacuum chamber component is detachably connected to said yolk chamber component via a press fitting.

9. A device as in claim 8, wherein said press fitting is a ribbed press fitting.

10. A device as in claim 1, wherein said yolk chamber component is 100 mm from said first opening to said second opening, with a diameter of 54 mm.

11. A device as in claim 1, wherein a maximum diameter of said yolk chamber component is less than half of a maximum diameter of said vacuum chamber component.

12. A device as in claim 1, wherein said vacuum chamber component is ovoidal.

13. A device as in claim 1, wherein said vacuum chamber component is compressible to expel a volume of air that exceeds a volume of said yolk chamber component.

14. A method comprising:
    connecting a vacuum chamber comprising an opening to a yolk chamber component comprising a first opening and a second opening, such that said second opening of said yolk chamber component is detachably connected to said opening of said vacuum chamber component, wherein a volume of said vacuum chamber component is greater than a volume of said yolk chamber component, wherein said yolk chamber component is internally cylindrical between an intermediate point of said yolk chamber component and said second opening of said yolk chamber component, and tapers linearly from said intermediate point to said first opening of said yolk chamber component, wherein said intermediate point is located between said first opening and said second opening, wherein said first opening has a first diameter and said second opening has a second diameter, and wherein said first diameter is less than said second diameter;
    compressing said vacuum chamber component, wherein said compressing is sufficient to cause a portion of air to be displaced from said connected vacuum chamber component and yolk chamber component, and wherein a volume of said portion of air exceeds a volume of said yolk chamber component;
    placing said first opening of said yolk chamber component against an egg yolk;

releasing pressure on said vacuum chamber component until said egg yolk is drawn into said yolk chamber component;

compressing said vacuum chamber component at least until said egg yolk emerges intact from said yolk chamber component; and disconnecting said yolk chamber component from said vacuum chamber component.

15. A method as in claim 14, further comprising separately cleaning said yolk chamber component and said vacuum chamber component.

16. A method as in claim 14, wherein said yolk chamber component consists primarily of one or more of polycarbonate, polypropylene, styrene acrylonitrile, and copolyester.

17. A method as in claim 14, wherein:
said yolk chamber component is symmetric about a first axis, and said vacuum chamber component is symmetric about a second axis, and
when said yolk chamber component is connected to said vacuum chamber component, said first and second axes are aligned.

18. A method as in claim 17, wherein said yolk chamber component comprises varying radii about said first axis.

19. A method as in claim 17, wherein said vacuum chamber component comprises varying radii about said second axis.

20. A method as in claim 14, wherein said yolk chamber component is transparent.

21. A method as in claim 14, wherein said vacuum chamber component consists primarily of at least one of thermoplastic elastomer and silicone.

22. A method as in claim 14, wherein said vacuum chamber component is detachably connected to said yolk chamber component via a press fitting.

23. A method as in claim 22, wherein said press fitting is a ribbed press fitting.

24. A method as in claim 14, wherein said yolk chamber component is 100 mm from said first opening to said second opening, with a diameter of 54 mm.

25. A method as in claim 14, wherein a maximum diameter of said yolk chamber component is less than half of a maximum diameter of said vacuum chamber component.

26. A method as in claim 14, wherein said vacuum chamber component is ovoidal.

\* \* \* \* \*